United States Patent [19]

Angelo et al.

[11] 4,104,438
[45] Aug. 1, 1978

[54] GAS-BARRIER COATED FILMS, SHEETS OR FOILS AND METHOD OF PREPARATION

[75] Inventors: Rudolph John Angelo; Richard Nelson Blomberg, both of Wilmington; Fritz Peter Boettcher, Newark, all of Del.; Richard Masayoshi Ikeda, Chadds Ford, Pa.; Michael Robert Samuels, Newark, Del.

[73] Assignee: E. I. Du Pont de Nemours and Company, Wilmington, Del.

[21] Appl. No.: 630,996

[22] Filed: Nov. 12, 1975

Related U.S. Application Data

[63] Continuation-in-part of Ser. No. 542,237, Jan. 20, 1975, abandoned.

[51] Int. Cl.$^2$ ............................................ B32B 27/34
[52] U.S. Cl. .................................. 428/332; 427/248 B; 427/248 H; 428/336; 428/458; 428/474; 428/476; 428/910; 428/911; 428/913; 528/288

[58] Field of Search ................... 427/248 B, 248 H; 428/474, 332, 336, 913, 911, 458, 476, 910; 260/78 R

[56] References Cited

U.S. PATENT DOCUMENTS

| | | | |
|---|---|---|---|
| 3,686,022 | 8/1972 | White et al. | 427/248 H |
| 3,829,324 | 8/1974 | Blais et al. | 427/44 |
| 3,843,481 | 10/1974 | Hoheisel | 428/414 |
| 4,009,153 | 2/1977 | Shin | 260/78 R |

*Primary Examiner*—George F. Lesmes
*Assistant Examiner*—Stanley S. Silverman

[57] ABSTRACT

Films, sheets or foils are given a gas-barrier coating of an aromatic polyamide, polyimide, polyamide-imide, polyhydrazide, polyamide-hydrazide, or polyazomethine by direct vapor-phase condensation polymerization of their respective monomers. The monomers are introduced in an inert diluent gas, mixed and reacted in the presence of the surface to be coated. The surface is maintained above the critical minimum deposition temperature of the monomers but below about 300° C. The coating is formed to a thickness between about 0.1 and 0.6 mil.

3 Claims, 1 Drawing Figure

4,104,438

GAS-BARRIER COATED FILMS, SHEETS OR FOILS AND METHOD OF PREPARATION

CROSS REFERENCE TO RELATED APPLICATION

This application is a continuation-in-part of our prior copending United States application Ser. No. 542,237, filed Jan. 20, 1975, now abandoned.

BACKGROUND OF THE INVENTION

This invention relates to coated films, sheets or foils and, more particularly, to the application of a gas-barrier coating thereto.

Lindlof, U.S. Pat. No. 3,607,365, discloses a vapor-phase technique for the preparation of coatings of polyurethanes and polyureas by the reaction of isocyanates with alcohols or amines. A wide variety of substrates are disclosed including biaxially oriented polyethylene terephthalate (PET) film. The purpose of the coating is variously described as being protective and to give the coated film anti-static and anti-blocking properties. Lindlof's method involves alternately exposing a substrate to vapors of the isocyanate and then to the amine or alcohol until a polymeric coating is built up. Lindlof stresses that his reaction takes place on the substrate surface by first one compound being absorbed or reacted thereon and then the next compound reacting with the ends of the molecules of the first compound which bristles perpendicularly from the substrate surface. Neither reaction liberates any reaction by-product.

Blais et al., U.S. Pat. No. 3,829,324, discloses providing coatings of condensation polymers on polymeric substrates after electrical discharge treatment of the surface. When more than one monomeric precursor is involved, the substrate is exposed to successive exposures to the precursors. The precursors may be applied in the solid, liquid or vapor state.

Hoheisel, U.S. Pat. No. 3,843,481, discloses improving the heat and/or flame resistance of polyester films by applying a covering layer of an aromatic polyamide, polyamide-imide or polyimide. The covering layer is applied over an intermediate layer of the reaction product of an aromatic polyisocyanate with an epoxide resin. The covering layer can be applied from solvents, dispersions or by extrusion coatings. The products are said to be particularly suitable for use in electrical insulations.

SUMMARY OF THE INVENTION

It has been found that a gas-barrier coating can be formed on film, sheeting or foil substrate by the direct vapor-phase condensation polymerization of an aromatic polyamide, polyimide, polyamide-imide, polyhydrazide, polyamidehydrazide or polyazomethine from their respective monomers by introducing and vaporizing the monomers, mixing the vaporized monomers in the presence of an inert diluent gas and reacting said mixed monomers in a reaction zone in the presence of the substrate to be coated which is heated above the critical minimum deposition temperature of the monomers but below about 300° C., and forming the condensation polymer on the surface of the film. It has been found that superior gas-barrier properties can be obtained on such substrates when coated according to the process of this invention as compared to those obtained when the same polymers are made by conventional techniques and subsequently coated on the substrates such as by solvent coating.

BRIEF DESCRIPTION OF THE DRAWING

The Figure is a schematic illustration of a flow sheet of the process of this invention.

DETAILED DESCRIPTION OF THE INVENTION

Figure 1:
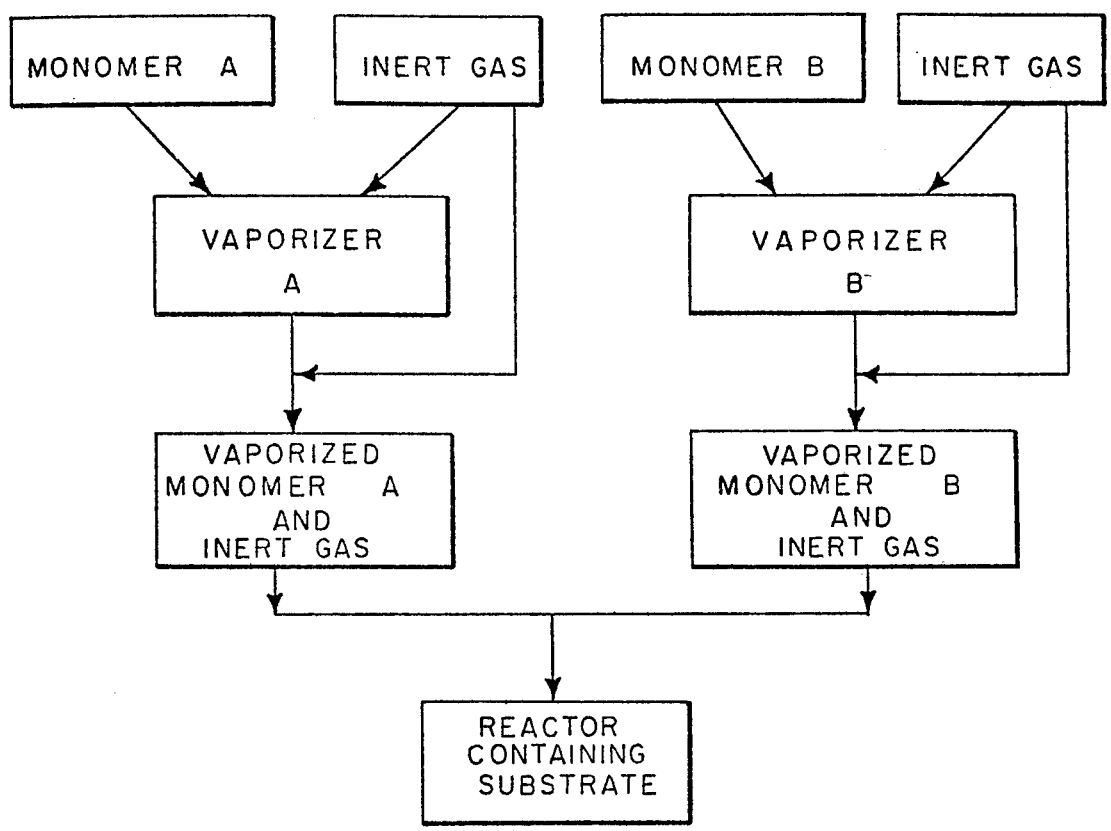

As indicated in the drawing, inert gas which may be preheated is introduced into a vapor chamber where a reactant or monomer is introduced into the gas stream or the inert gas may be mixed with the vaporized monomer after the vaporizer. The monomer may be introduced into the vaporizer at one time in solid or liquid form or may be introduced continuously. Where the monomers are introduced continuously in liquid form, it is usually convenient to operate the vaporizer at a relatively high temperature to insure rapid, full evaporation of the monomer and then reduce the gas temperature at the reactor. Two monomer vaporizers are shown but several may be used as, for example, when copolymers are prepared. In some cases, two monomers may be vaporized in the same vaporizer. The reactive monomers are thereafter brought together in the reactor and in the presence of the surface to be coated. Additional inert gas may be introduced directly into the reactor if desired. It is postulated that vapor-phase reaction occurs to at least dimer and that the dimer, trimer, etc. condense out on the surface and further react to form a polymer. In any event, it is necessary to have the monomer vapors present together for the reaction. The unreacted monomers and byproducts are vented from the reaction chamber and may be collected by filtration or by scrubbers to clean the inert gas. The inert gas may be recycled if it is so desired.

Aromatic polyamides are high polymers wherein alternating aromatic units (e.g., units corresponding to diamines and diacids) are joined by amide linkages. These can be prepared from monomers such as aromatic diamines and derivatives of aromatic diacids which will react with those diamines such as aromatic diacid halides. Representative monomers are described in Hill et al., U.S. Pat. No. 3,006,899, and Kwolek et. al., U.S. Pat. No. 3,063,966, the teachings of which patents with respect to the dislcosed monomers are incorporated herein by reference. Particularly preferred diamines are p-phenylene diamine (PPD), m-phenylene diamine (MPD) and the lower alkyl (i.e., below 5 carbon atoms) substituted derivatives of those diamines. Particularly preferred diacid halides are terephthaloyl chloride (TCl) and isophthaloyl chloride (ICl) and their lower alkyl substituted derivatives. Especially preferred polymers are the condensation products of PPD and TCl, the products of MPD and TCl, and the products of MPD and ICl. Particularly preferred are coatings on an organic polymeric film, especially PET film, of an aromatic polyamide consisting essentially of units of PPD and terephthalic acid having a density greater than about 1.42 grams/cc., a planar X-ray orientation, and a morphology, as determined by an electron microscope, of a coalesced particulate texture.

Aromatic polyimdies are high polymers wherein aromatic units are joined together by imide linkages, e.g.,

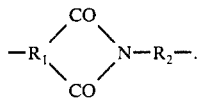

These are typically prepared from aromatic dianhydrides and aromatic diamines. Representative monomers are described in Edwards, U.S. Pat. Nos. 3,179,634, and Endrey, U.S. Pat. 3,179,633, the teachings of which patents with respect to monomers are incorporated herein by reference. Particularly preferred are polyimides formed from pyromellitic dianhydride (PMDA) and 4,4'-diaminodiphenyl ether (POP) or PPD. If the surface temperature of the substrate is relatively low, for example, below about 200° C. (e.g., about 185° C.), the "condensation polymer" formed on the substrate surface may not be the final polyimide but rather a partial polymer, the polyamic acid, whose linkages between units are amic acid linkages, e.g.,

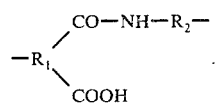

Such a coated article can be used as such or converted by heat to the polyimide. The aromatic diamine may have an additional amino group located ortho or peri to each amino group (thereby making it a tetraamine). In such cases, when the compound is reacted with an aromatic anhydride, the condensation polymer is a polyamic acid whose linkages are

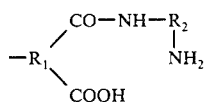

These polyamic acids may on further heating be at least partially converted to modifications of polyimides having the structural linkages:

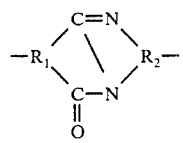

better known as polypyrrones. Conventional methods for making such polymers appear in British Pat. No. 1,101,641. Preferred anhydrides are PMDA and 3,4,3',4'-tetra-aminodiphenyl (DAB). Other starting materials are mentioned in the British Patent.

Aromatic polyamide-imides are high polymers wherein aromatic units are alternately joined by amide linkages and imide linkages. Suitable monomers for the formation of such polymers are disclosed in Lavin et. al., U.S. Pat. No. 3,260,691, the teachings of which patent with respect to monomers are incorporated herein by reference. Typically, the polymers are prepared by the reaction of an aromatic diamine with an aromatic tricarboxylic acid compound with at least one pair of the acid groups in the ortho position. Typical of such a compound is the monoacid chloride of trimellitic anhydride (TMACl). Suitable polymers can be made from the latter compound with POP or PPD. Again, if the surface temperature of the substrate is low enough, the "condensation polymer" formed thereon may have amic acid linkages in place of imide linkages. The article can be converted by heat to form the polyamide-imide.

Aromatic polyhydrazides are high polymers formed by the reaction of an aromatic diacid derivative with hydrazine ($NH_2$-$NH_2$). Conventional methods for making such polymers are disclosed in the literature, for example, see "High Temperature Resistant Polymers," by A. H. Frazer (Wiley & Sons, Inc. 1968), pages 85–90. It is preferred to use as one of the starting materials a reaction product of excess hydrazine with one diacid ester of isophthalic and/or terephthalic acids to form the hydrazide and then complete the polymerization with addition of diacid chloride in the vapor phase. It is preferred to form the hydrazide of isophthalic acid and react it with the diacid chloride of terephthalic acid.

Aromatic polyamide-hydrazides are high polymers wherein aromatic units are joined by amide linkages (—CO—NH—) and hydrazide linkages (—CO—NH—NH—CO—). Conventional methods for making such polymers are disclosed, for example, in Preston, U.S. Pat. No. 3,584,046, the teachings of which as to aromatic starting materials are incorporated hereby by reference. It is preferred to use as one of the starting materials an aromatic aminoacid monohydrazide (e.g., p-aminobenzhydrazide) which can be prepared as set forth in U.S. Pat. No. 3,584,046. The other starting material is preferably an aromatic diacid chloride, e.g., terephthaloyl or isophthaloyl chloride. When the aromatic aminoacid monohydrazide is reacted in the vapor phase, it forms a polyamide-hydrazide with repeating units $+NH-R_1-CO-NH-NH-CO-R_2-CO+_n$ or $+NH-R_1-CO-NH-NH-CO-R_2-CO-NH-NH-CO-R_1-NH-CO-R_2-CO+_n$. As can be seen, the predominance of one structure over the other depends upon whether one or two of the free —COCl groups on an aromatic diacid chloride molecule are reacted with the free hydrazide groups of the aromatic aminoacid monohydrazide.

Aromatic polyazomethines are high polymers formed by the reaction of aromatic diamines with aromatic dialdephydes. Conventional methods for making such polymers appear in Defensive Publication T918,005 of Baker et al., published by the U.S. Patent Office on Jan. 1, 1974, (918 Official Gazette 104). The teachings of the reference as to aromatic starting materials are incorporated herein by reference. These polymers are characterized by the repeating units $+R_1-N=CH-R_2-CH=N+_n$. Preferred starting materials are the diaminobenzenes, e.g., paraphenylene diamine, and the phthalaldehydes, e.g., terephthalaldehyde (TA).

By the term "inert diluent gas" is meant any gas which will serve as a carrier for the particular monomer in question which will not inhibit the reaction of the monomer being carried thereby. Representative of such gases are nitrogen, carbon dioxide, argon, neon, krypton, methane, sulfur dioxide, hydrogen chloride and FREON ® fluorocarbons. Nitrogen is preferred.

The term "critical minimum deposition temperature" (CMDT) is the minimum temperature at which the substrate to be coated must be maintained to obtain a continuous coating of the polymers applied by the vapor-phase polymerization of this invention. If vapor-phase reactions are carried out with the substrate at too low a temperature, a powder is formed which is of low molecular weight and which does not adhere to the substrate. Above the CMDT, good continuous coatings can be formed. Several polymer systems and their critical minimum deposition temperatures are discussed herein and listed in Table I. The coating adhesion to the base depends to some extent upon the nature of the base film and its previous treatment as well as the deposition temperture. In general, it is preferred that the substrate be at least about 20° C. above the CMDT. The substrate temperatures may be as high as about 300° C. It is frequently preferred that the temperature be within the range of about 120° C. to about 250° C. For PPD and TCl, substrate temperatures above 300° C. tend to give coatings which lack fine grain texture and are composed of large bumps.

The monomers are introduced into the reaction zone in the inert diluent gas in the vapor state. The monomer concentrations need not be stoichiometric and the balance may differ by as much as 2 to 1 although approximate stoichiometry is preferred. It is preferred that the concentration of monomers in the inert gas range from about 0.2 to about 10 torr. It is convenient and therefore preferred to carry out the reaction under a total pressure essentially atmospheric; however, adequate concentrations of the reacting monomers should be maintained at the reactor even though the total pressure may vary from atmospheric.

The monomers can be vaporized by means known to those skilled in the art, e.g., by exposing them into heated tubes maintained at suitable temperatures. The heated tubes may be at temperatures above the reaction temperature.

A wide variety of films, sheets or foils as substrates can be used in this invention. The term "films" ordinarily describes substrates up to about 10 mils in thickness, whereas the term "sheets" is meant to include substrates both unshaped (i.e., flat) and shaped (i.e., trays or containers, including bottles) up to about 50 mils in thickness. The substrates can be of various materials, e.g., organic polymers such as polyethylene terephthalate or other polyesters, polyimides, cellophane, polyvinyl fluoride and perfluorocarbons, polypropylene, or polyethylene, as long as the polymeric article maintains its form at above the CMDT; metal foils such as aluminum, copper, iron, tin and nickel; and papers.

When the desired coating thickness is built up, the substrate can be removed from the reactor. In a continuous process, it it possible to run substrates through a reactor with an amount of residence time which will build up the desired coating thickness. Coating thicknesses generally will run from about 0.01 mil to about 0.6 mil in thickness. However, it is generally preferred that the thickness range from about 0.05 to about 0.2 mil.

Polymeric films, sheets and foils can be coated in accordance with this invention to produce unexpectedly superior gas-barrier properties when compared to those coated with the same polymers but which have been polymerized by conventional means and conventionally solvent coated onto the film. The invention is also advantageous in that it enables a coating of some polymers onto films, e.g., aromatic polyimides from POP and PMDA onto PET film, which could not ordinarily be coated onto organic polymeric films without considerable difficulty. In addition to good gas-barrier properties, coated films, sheets or foils can be obtained which exhibit good friction and wear resistance, flex strength, low coefficient of expansion and excellent temperature resistance.

Coated substrates can be obtained which further possess advantageous electrical properties. In wedges and slot liners, the high temperature coatings prevent cut-through when the equipment is operated at elevated temperatures. The excellent dielectric strength makes the objects suitable for wire and cable wrap as well as printed circuits. In this regard, if a mask is placed over the film or foil, the vapor-phase deposition will be laid down in pattern form suitable for subsequent etching. Capacitors may be prepared from coated foils, films or metallized surfaces. Sandwich capacitors may be prepared by alternate depositions of electrode and dielectric.

Applications in which the low permeability characteristics and chemical resistance of the coatings are important include duct wrap, chrome strip replacement, metallized yarns and in packaging. The term "packaging" includes trays, containers and bottles as well as flexible pouches. In order to provide sealability, adhesives or coatings may be applied to the substrate and laminates may be formed. The packaging applications include comestibles as well as industrial items.

The invention will now be described in connection with the following examples wherein parts and percentages are by weight unless otherwise specified and wherein measurements of permeability, viscosity and CMDT are as described.

Oxygen Permeability — The oxygen permeability of films was measured at about 80° F. (27° C.) using an "Ox-tran 100" with a 3 inch diameter cell from Modern Controls, Inc., Minneapolis, Minnesota. The OPV is oxygen permeability value in units of cc. of oxygen (at standard temperature and pressure) for 100 square inches of specimen for 24 hours for one atmosphere pressure difference. The unit OPV/mil is equivalent to the OPV for a one mil thick film.

Helium Permeability — The volumetric method was used to measure the helium permeability in units of cc. of helium (at standard temperature and pressure) for 100 square inches of specimen for 24 hours for one atmosphere pressure drop. The method is described in ASTM-D1434 Method V.

Moisture Vapor Transmission — The moisture vapor transmission rate was measured by ASTM E9666 Procedure E in grams for 100 square meters of specimen for one hour.

Inherent Viscosity — The viscosities were measured at 0.5 weight percent in the described solvent at 30° C. in accordance with ASTM-D2857. Canon-Fenske viscometers described in ASTM-D2515 were used.

The following code letter are used herein as follows:

| | |
|---|---|
| MPD | m-phenylene diamine |
| POP | 4,4'-diaminodiphenyl ether |
| PPD | p-phenylene diamine |
| IPH | Isophthalic bishydrazide |
| PMDA | Pyromellitic dianhydride |
| TCl | Terephthaloyl chloride |
| TMACl | Monoacid chloride of trimellitic anhydride |
| ICl | Isophthaloyl chloride |
| PET | Polyethylene terephthalate |
| PPD-T | The polyamide formed from PPD and TCl |
| PPD-I | The polyamide formed from PPD and ICl |
| MPD-T | The polyamide formed from MPD and TCl |
| MPD-I | The polyamide formed from MPD and ICl |
| MPD-I/T | The polyamide formed from MPD and a mixture of TCl and ICl |
| PA | Polyamic acid |
| PI | Polyimide |
| OI-OT | Polyhydrazide |
| AI | Amide-imide (may contain amic acid below 200° C.) |

-continued

| | |
|---|---|
| A | Polyimide film from POP/PMDA (1 mil thick) |
| B | 2-mil oriented heat-set and dimensionally stabilized PET film |
| $T_a$ | Temperature of monomer A in ° C. |
| $T_b$ | Temperature of monomer B in ° C. |
| $T_c$ | Temperature of the substrate in the reactor in ° C. |
| DAB | 3,4,3',4'-tetraaminodiphenyl |
| TA | Terephthalaldehyde |
| PABH | p-aminobenzhydrazide |
| AH | Polyamide hydrazide |
| PPD-TA | Polyazomethine formed from PPD and TA |
| PY | Polypyrrone |

Critical Minimum Deposition Temperature — The critical minimum deposition temperature (CMDT) can be determined by reacting the monomers in the presence of a substrate at various temperatures until a continuous coating is formed. The results for a number of systems are shown in Table I.

TABLE I

| Monomer A | Melt, ° C. | Monomer B | Melt, ° C. | CMDT, ° C. |
|---|---|---|---|---|
| PPD | 143 | TCl | 78 | 160 |
| MPD | 56 | ICl | 42 | 142 |
| PPD | 143 | TMACl | 67 | 170 |
| POP | 188 | PMDA | 286 | 159 |
| POP | 188 | TMACl | 67 | 145 |
| PPD | 143 | PMDA | 286 | 130 |
| IPH | 219 | TCl | 78 | 120 |
| PABH | 226 | TCl | 78 | ~100 |
| PPD | 143 | TA | 116 | 100 |
| DAB | 172 | PMDA | 286 | 145 |

EXAMPLE 1

A vaporizer for PPD at 200° C. was adjusted for 26 g./min. evaporation and a flow rate of $N_2$ of 200 SCFH (Standard Cubic Feet per Hour). Similarly, TCl was evaporated at 49 g./min. in $N_2$ at 140 SCFH. The TCl containing stream was perfused into the PPD containing steam through a porous cylindrical wall 1 inch inside diameter by 8 inches long at about 240° C. and fed to a reactor 6 inches inside diameter and 4 feet long at about 210° C. together with an additional $N_2$ input of 480 SCFH. The reactor walls were maintained about 160° C. The lower half of the reactor was filled with sodium chloride (coarse salt), and 4 sheets of oriented heat-set PET film 2 mils in thickness were mounted on both sides of a 5-in. by 12-in. sheet of aluminum (suspended above the salt) which was in temperature equilibrium with and exposed to vapors at temperatures averaging about 175° C. for 15 minutes. The coating of the polyamide (PPD-T) was about 0.1 mil thick and the oxygen permeability on two PET film specimens was 0.05 and 0.15 OPV.

EXAMPLE 2

In a similar experiment to Example 1, a 1- mil polyimide (POP/PMDA) film was mounted on nickel foil. The monomer ratio TCl/PPD was 50/27 with a flow of $N_2$ of 40 SCFH to each monomer stream and a vaporization temperature of about 280°–290° C. The PPD and TCl containing streams were mixed in the central section of a porous tube 1 inch in I.D. and 8 inches long through which 200 SCFH of $N_2$ at 300° C. were perfused. This stream was fed to the reactor to which an additional 540 SCFH $N_2$ at 350° C. was added. The reactor wall temperature was 250° to 320° C. and the reactor temperature averaged 300° C. The polyimide film on the nickel foil was in temperature equilibrium with the reactor walls and vapor. The exposure time was about 12 minutes. The coating on the film was about 0.2 mil thick. The helium permeability was measured on a sample by the volumetric method and found to be less than 0.01. This is an extraordinarily low transmission rate.

EXAMPLE 3

A 6-inch by 6-inch sheet of biaxially oriented, heat-set PET film, 2mils in thickness, was annealed on a frame at 230° C for 2 hours to obtain good 200° C. dimensional stability. The film was taped onto nickel foil that was rolled into a cylinder and inserted into the reactor. The reactor was a 2-inch (outside diameter) stainless steel tube heated to about 190° C. After allowing about 10 minutes for temperature equilibrium between the wall and the film, nitrogen streams at about 190° C. containing the vaporized monomers PPD and TCl were mixed in the reactor. The total gas flow was about 70 SCFH containing about 0.2 mol percent (1.5 torr) of reactants. The PPD/TCl mol ratio was 1.12. After about 5 minutes of exposure to this gas stream, a coating of the polyamide PPD-T was deposited on the film approximately 0.15 mil in thickness with a coating weight of about 0.13 gram. A test of the sample indicated that it had an OPV of about 0.03 (an OPV/mil of about 0.0046). The OPV increased to about 0.07 after the sample was exposed 72 days to 100% relative humidity at 70° F. The moisture vapor transmission rate was 20.

When the coating is examined under an electron microscope at 3000X, the coating appears to have a coalesced particulate texture, and differs from that of a solvent-cast film of essentially the same molecular weight having a smooth nonparticulate appearance. When coatings are stripped from a surface and examined with X-ray, the vapor-deposited material has planar orientation and the solvent-cast film has random orientation. The density measured in a gradient tube was 1.46 to 1.49 g./cc., considerably higher than the solvent-cast film at 1.40 g./cc.

For comparison, PPD-T polymer was prepared in accordance with Kwolek et al. having inherent viscosity of 5 (0.5% in conc. $H_2SO_4$). A 2% solution was prepared in conc. $H_2SO_4$. The solution was coated on 0.92-mil biaxially oriented, heat-set PET film with a Meyer rod. The film was immersed in ice water, rinsed with sodium bicarbonate solution and dried in a vacuum oven. The uncoated control had an OPV of 3.8 while a film with 0.13 mil of coating had an OPV of 2 (an OPV/mil of about 0.85). This illustrates a transmission of oxygen many times greater than the sample coated with a vapor-phase polymerized coating of the same polymer.

EXAMPLE 4

Example 3 was repeated except that the film was a 6 inch by 6 inch sheet of (POP/PMDA) polyimide film approximately 1 mil in thickness mounted on 5-mil aluminum foil. After a 2.5 minute exposure to the gas stream, a polymer coating of about 0.074 gram was deposited on the film (0.07 mil in thickness). The total $N_2$ flow rate was 102 SCFH. The film temperature was 175° C., the monomer vapor pressure 1.2 torr and the TCl/PPD mol ratio 0.89. The sample exhibited an OPV of 0.2. The uncoated film had an OPV of 7.4.

EXAMPLE 5

An amide-imide coating was applied to a polyimide film as in Example 4. Trimellitic anhydride acid chloride (TMACl) was evaporated in 20 SCFH of $N_2$ and a similar stream of PPD was prepared. The TMACl/PPD mol ratio was 1.27. The reactor and film substrate temperature was 180° C. and the reaction time 10 minutes. The coating thickness was 0.06 mil and the coating had an inherent viscosity in conc. $H_2SO_4$ of 0.19 dl./g. and a density of 1.44 g./cm². The OPV of the sample was 0.13 (an OPV/mil of about 0.008).

For a general comparison, an amide-imide coating on polyimide (POP/PMDA) film was prepared by coating the polyamide-amic acid from a 20% solution in dimethylacetamide (DMAc) to polyimide film. The polyamide-amic acid was prepared from PPD and TMACl and had an inherent viscosity of 0.39 (0.5% in DMAc). The sample was dried at about 70° C. for about 45 minutes and then heated in an oven up to about 275° C. for about 45 minutes and converted to polyimide. For eight samples, the coating thickness ranged from about 0.15 to 0.39 mil and the OPV from 0.14 to 0.70 (an average of 0.27 and an average OPV/mil of about 0.07).

EXAMPLE 6

A series of runs was made at several temperatures to show the effect of critical minimum deposition temperature (CMDT) and the effect of temperature upon the adhesion of the same coating to two different substrates. The PPD-T system as described in Example 3 was used and coating weights of 1 to 4 mg./in.² applied. At low substrate tempertures, a continuous coating did not form but rather a powder. As the CMDT is exceeded, a continuous, well-coalesced coating is formed. The adhesion of this coating to the substrate depends upon the condition and nature of the substrate film, and to gain good adhesion a temperature well above the CMDT may be required.

The results for oriented, heat-set PET film and for (POP/PMDA) polyimide film are that the CMDT is about 160° C. Above this temperature, good adhesion and good coating is obtained on PET film. For the polyimide film, a good coating is similarly obtained but good adhesion is not obtained until the temperature is raised above 260° C. A plot of the inherent viscosities (0.5% in concentrated $H_2SO_4$) as a function of substrate temperature shows a discontinuity near the CMDT, i.e., going above the CMDT causes a sharp increase in the inherent viscosities of the polymer. For example, just below the CMDT, the inherent viscosity is about 1. At a substrate temperature of about 200° C., the inherent viscosity is about 2, whereas at 300° C., the inherent viscosity is over 3.

EXAMPLE 7

In this example, metaphenylene diamine (MPD) was reacted with isophthaloyl chloride (ICl) to coat oriented, heat-set PET film.

The monomers were evaporated in two separate heated streams of $N_2$ each at 32 SCFH. After the flows and temperatures had been adjusted, the monomers were introduced into the evaporation tubes (41 mm. OD and 15 inches long). The MPD was maintained at 160°–167° C. while the ICl was at 157° to 164° C. The calculated equilibrium vapor pressures were above 15 torr, but the actual pressures were less than this value. The flow streams were joined at the entrance to the reactor (a 3-inch glass pipe 18 inches long) maintained at 176° to 179° C. A 6-inch by 6-inch piece of the 2-mil PET film which had been dimensionally stabilized (as in Example 3) was taped to 5-mil aluminum foil and placed in the center section of the reactor and was at the reactor temperature. The reaction time was 10 minutes. The MPD-I coating was clean, smooth and colorless.

The coated film has an OPV of 0.18 compared to that of an uncoated PET control film of 2.2. The coating deposit was 0.56 mil thick (75 mg./in.²). The permeability calculated for the coating alone was 0.11 OPV/mil. A similar coating was removed from aluminum foil by solution of the aluminum in hydrochloric acid. The inherent viscosity measured in conc. $H_2SO_4$ at 0.5% by weight polymer was 0.34 dl./g.

For a general comparison, MPD-I was prepared by reacting MPD with ICl in DMAc. The inherent viscosity in 0.5% in concentrated $H_2SO_4$ was 1.97. A 10% solution was prepared in DMAc having 1% LiCl. The solution was coated on oriented, heat-set PET film using a Meyer rod and dried under restraint at 120° C. for 1 hour. The samples were then leached with water for 6 hours to remove LiCl and dried at 100° C. overnight under restraint. The coatings were clear, colorless, smooth and adhered. Five specimens with a coating 0.2 mils thick had a range of OPV values from 1.6 to 1.85 (OPV/mil average of 2.6). In a similar manner, self-supporting films were prepared by casting on glass plates. Seven specimens were tested. One had a pinhole and was excluded, but the remainder had a range of OPV/mil values from 1.6 to 5.1 with an average of about 2.5.

EXAMPLES 8 to 25

Experiments were carried out in the same manner described in Example 7 with several polymer systems. The $N_2$ flow was equal in the two feeds and the total was 64 SCFH. The reaction conditions are given in Table II. Measurements on some of the coated polymeric film substrates are contained in Table III.

Coatings such as those described in Examples 3, 4 and 8 to 25 have been applied to NOMEX ® aramid Type 410 paper, TEFLON ® FEP perfluorocarbon polymer film, aluminum foil, iron alloy sheets, bond paper, copper foil, cellophane, cellulose acetate, polyketone, polysulfone, plastic bottles, plastic (PET) food trays, etc. The dielectric breakdown voltage has been measured on PPD-T coated on aluminum foil as 8.5 kv./mil illustrating excellent dielectric properties. Other vapor-phase deposited polymers disclosed herein also showed advantageous dielectric properties.

TABLE II

| EXAMPLE | MONOMER A | $T_a$ | MONOMER B | $T_b$ | SUBSTRATE | COATING | $T_c$ | REACTION TIME (min.) |
|---|---|---|---|---|---|---|---|---|
| 8 | POP | 197 | PMDA | 246 | A | PI | 222 | 10 |
| 9 | POP | 198 | PMDA | 246 | B | PI | 220 | 10 |
| 10 | PPD | 147 | PMDA | 243 | B | PI | 211 | 10 |
| 11 | IPH | 201 | TCl | 138 | B | OI-OT | 196 | 10 |
| 12 | IPH | 198 | TCl | 139 | A | OI-OT | 179 | 15 |
| 13 | PPD | 143 | TMACl | 172 | B | AI | 187 | 10 |
| 14 | POP | 190 | TMACl | 171 | B | AI | 188 | 20 |
| 15 | POP | 195 | TMACl | 170 | A | AI | 187 | 15 |

TABLE II-continued

| EXAMPLE | MONOMER A | $T_a$ | MONOMER B | $T_b$ | SUBSTRATE | COATING | $T_c$ | REACTION TIME (min.) |
|---|---|---|---|---|---|---|---|---|
| 16 | MPD | 158 | TCl | 159 | B | MPD-T | 190 | 10 |
| 17 | MPD | 159 | TCl | 159 | A | MPD-T | 188 | 7 |
| 18 | PPD | 155 | ICl | 158 | B | PPD-I | 185 | 3 |
| 19 | PPD | 155 | ICl | 155 | A | PPD-I | 185 | 4 |
| 20 | MPD | 158 | ICl (70) TCl (30) | 156 | B | MPD-I/T | 10 | 7 |
| 21 | MPD | 159 | ICl (70) TCl (30) | 157 | A | MPD-I/T | 192 | 10 |
| 22 | POP | 189 | PMDA | 228 | * | PA | 185 | 20 |
| 23 | PABH | 232 | TCl | 147 | B | AH | 151 | 20 |
| 24 | PPD | 155 | TA | 150 | B | PPD-TA | 177 | 10 |
| 25 | DAB | 254 | PMDA | 257 | A | PY | 246 | 30 |

*perfluorocarbon film (TEFLON ® FEP)

TABLE III

| EXAMPLE | OPV COATED | CALC'D** OPV.MIL | COATING mg./in.$^2$ (mil) | $\eta$INH* dl./g. | REMARKS |
|---|---|---|---|---|---|
| 8 | 5.6 | 1.5 | 1.5 (0.06) | 0.29 fuming HNO$_3$ | Clear, glossy, yellow. Tightly adhered. |
| 9 | 1.4 | 0.77 | 4.5 (0.195) | (same as Example 8) | Yellow, glossy. Tightly adhered. |
| 10 | 0.9 | 0.3 | 48 (0.21) | Insol. fuming HNO$_3$ | Clear, glossy, yellow-orange. Tightly adhered. |
| 11 | 0.07 | 0.006 | 1.8 (0.08) | 0.30 | Hazy, white. Tightly adhered |
| 12 | 0.09 | 0.009 | 2.4 (0.10) | (same as Example 11) | Hazy, white. Tightly adhered. |
| 13 | 0.05 | 0.006 | 2.8 (0.12) | 0.26 | Clear, yellow, glossy. Tightly adhered |
| 14 | 0.12 | 0.3 | 2.4 (0.11) | 0.21 | Clear, yellow, glossy. Tightly adhered. |
| 15 | 1.8 | 0.3 | 2.6 (0.12) | (same as Example 14) | Clear, yellow, glossy. Tightly adhered. |
| 16 | 0.48 | 0.11 | 4.0 (0.18) | 0.70 (off Al) | Clear, colorless, smooth; some haze. Adhered tightly. |
| 17 | 0.82 | 0.13 | 3.2 (0.14) | (same as Example 16) | Clear, smooth. Adhered tightly. |
| 18 | 0.69 | 0.12 | 2.5 (0.11) | 0.44 (off Al) | Smooth, glossy, clear with some haze. Adhered tightly. |
| 19 | 0.81 | 0.14 | 3.4 (0.15) | 0.38 | Clear, colorless, some surface roughness. Adhered tightly. |
| 20 | 0.75 | 0.16 | 2.8 (0.13) | 0.58 (off Al) | Clear, colorless, smooth, some haze. Adhered tightly |
| 21 | 1.50 | 0.21 | 2.4 (0.11) | 0.58 (off Al) | Clear, smooth, colorless. Adhered tightly. |
| 22 | [not measured] | | 4 (0.2) | 0.31 (0.5% DMAC) | Glossy, yellow coalesced film*** |
| 23 | 0.02 | 0.002 | 2.1 (0.09) | 0.44 (off Al) | White, glossy and translucent. Adhered tighty. |
| 24 | 0.7 | 0.01 | 0.24 (0.01) | 0.45 (from reactor) | Clear, yellow and glossy. Adhered tightly. |
| 25 | 1.8 | 0.15 | 1.4 (off Al) | Insoluble yellow-orange. | Clear, glossy and Adhered tightly. |

*measured on separate run from OPV peeled from TEFLON ® polyperfluorocarbon in 0.5% conc. H$_2$SO$_4$ at 30° C. unless otherwise noted. Where Al is indicated, the base was aluminum foil.
**The OPV for the base film was 2.2 for Examples 8 to 15; 2.0 for Examples 16, 18, 20, 23 and 24. The imide film in Examples 17, 19, 21 and 25 is 7.4.
***Polyamic acids can be converted to polyimides by heating.

For a general comparison with Example 12, a polyhydrazide was prepared by reacting isophthalic dihydrazide and TCl in hexamethyl phosphoramide. The isolated polymer had an inherent viscosity of 0.44 (0.5% in dimethyl acetamide at 30° C.). The coating solution was 20% solids in dimethyl acetamide and was coated using a Meyer rod onto oriented heat-set PET film. The coated film was dried under restraint at 80° C. for 1 hour followed by overnight at 100° C. in a vacuum oven. Eight specimens were tested. The coating ranged from 0.25 to 0.60 mil and the OPV ranged from 1.6 to 1.85. The coatings were clear, colorless and smooth but could be removed in the presence of moisture. The average OPV/mil was about 5.3, many times higher than the OPV/mil of the same polymer when applied as a vapor-phase polymer.

For a general comparison with Example 10, the polyimide from PPD and PMDA was prepared in DMAc by first forming the polyamic acid. The inherent viscosity was 1.54 (0.5% in DMAc at 30° C.). A 10% solution was coated on 1-mil polyimide (POP/PMDA) film. The film was dried under restraint at 70° C. for 45 minutes and then mounted in frames and heated in an oven which was programmed from room temperature to 275° C. over a period of 45 minutes. The polyamic acid was converted to polyimide which was insoluble in fuming $HNO_3$. The coatings were yellow-orange in color and ranged from 0.11 to 0.22 mils in thickness for nine samples and in OPV from 3.1 to 3.7. The average OPV/mil was about 0.9, about 3 times higher than the OPV/mil for the same polymer when applied as a vapor-phase coating.

The polyamide-hydrazide coated film of Example 23 exhibited a moisture vapor transmission rate of about 13 and a calculated rate per mil of about 1.7, whereas the uncoated base film has a moisture vapor transmission rate of about 43.2. Six samples of films prepared similarly to those of Example 23 having a polyamide-hydrazide coated to an average thickness of about $0.09 \pm 0.01$ mil on 2-mil polyester base were measured to determine OPV as a function of exposure to 100% relative humidity. Average OPV values after one and 3 weeks exposure were measured and found to be $0.07 \pm 0.01$ and $0.06 \pm 0.02$, respectively, compared to $0.04 \pm 0.01$ at the start of the test. The uncoated base film 2-mil PET has an average OPV of about $2.02 \pm 0.15$.

The characteristic permeability constant for the coating is calculated from the following formula:

$$\frac{1}{K_s} = \frac{t_1}{K_1} + \frac{t_2}{K_2}$$

where
$K_s$ = observed OPV of coated film,
$K_1$ = OPV/mil for coating,
$K_2$ = OPV/mil for base,
$t_1$ = thickness of coating in mils,
$t_2$ = thickness of base in mils.

Vapor-phase polymerized coatings can be produced having lower permeability constants than the conventionally prepared solvent-cast films and coatings.

We claim:

1. An organic polymeric film having a gas-barrier coating thereon of an aromatic polyamide consisting essentially of units p-phenylene diamine and terephthalic acid having a density greater than about 1.42, a planar X-ray orientation and an electron microscope morphology of a coalesced particulate texture.

2. The film as defined in claim 1 wherein the polymeric film is a polyimide film or a biaxially oriented, heat-set polyethylene terephthalate film.

3. A substrate having a coating thereon of an aromatic polyamide consisting essentially of units of p-phenylene diamine and terephthalic acid having a density greater than about 1.42, a planar X-ray orientation and an electron microscope morphology of a coalesced particulate texture.

* * * * *

UNITED STATES PATENT OFFICE
CERTIFICATE OF CORRECTION

PATENT NO. : 4,104,438

DATED : August 1, 1978

INVENTOR(S) : Rudolph John Angelo, et al.

It is certified that error appears in the above-identified patent and that said Letters Patent are hereby corrected as shown below:

Column 2, line 66, polyimdies should read -- polyimides -- . Column 3, line 35, $R_2$ should read --$R_2$- --. Column 5, line 6, temperture should read --temperature--. Column 5, line 47, it it possible should read --it is possible--. Column 6, line 51, letter should read --letters--. Column 7, line 37, steam should read --stream--. Column 10, line 14, has should read --had--. Column 11, Ex. 10, 48 should read --4.8--.

Signed and Sealed this

Eleventh Day of November 1980

[SEAL]

Attest:

SIDNEY A. DIAMOND

Attesting Officer

Commissioner of Patents and Trademarks